US008656390B2

(12) United States Patent
Hintermeister et al.

(10) Patent No.: US 8,656,390 B2
(45) Date of Patent: Feb. 18, 2014

(54) IMPLEMENTING SHADOW OBJECTS WITH RELOCATED RESOURCES TO FORM RELATIONSHIPS BETWEEN NEW AND OLD LOCATIONS

(75) Inventors: Gregory Richard Hintermeister, Rochester, MN (US); Tammy Lynn Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 1975 days.

(21) Appl. No.: 11/558,012

(22) Filed: Nov. 9, 2006

(65) Prior Publication Data

US 2008/0115129 A1 May 15, 2008

(51) Int. Cl.
G06F 9/46 (2006.01)
(52) U.S. Cl.
USPC .......................................... 718/100
(58) Field of Classification Search
USPC .......................................... 718/100
See application file for complete search history.

(56) References Cited

U.S. PATENT DOCUMENTS

| | | | |
|---|---|---|---|
| 6,453,350 B1* | 9/2002 | Factor | 709/226 |
| 6,728,884 B1* | 4/2004 | Lim | 726/12 |
| 6,772,161 B2* | 8/2004 | Mahalingam et al. | 1/1 |
| 7,062,624 B2* | 6/2006 | Kano | 711/165 |
| 2003/0115439 A1* | 6/2003 | Mahalingam et al. | 712/1 |
| 2004/0199609 A1* | 10/2004 | Papatla et al. | 709/220 |
| 2004/0239700 A1* | 12/2004 | Baschy | 345/781 |
| 2005/0055518 A1* | 3/2005 | Hochberg et al. | 711/159 |

OTHER PUBLICATIONS

Berners-Lee, et al. ("Uniform resource identifiers (URI): generic syntax", network group, Xerox corporation, Aug. 1998, request for comments 2396, pp. 1-38).*

* cited by examiner

Primary Examiner — Jennifer To
Assistant Examiner — Brian Chew
(74) Attorney, Agent, or Firm — Joan Pennington

(57) ABSTRACT

A method, apparatus and computer program product implement a shadow object when migrating or relocating a resource from one location to a new location. A user selected task on a resource is identified and analyzed to determine whether the task changes a location of the resource. When determined that the task changes a location of the resource, then a shadow object is created. Destination information is captured and stored into the shadow object. A future shadow object is created on a new host to inform administrators that a resource is to be relocated, or virtual server is to be migrated, at a scheduled time.

17 Claims, 5 Drawing Sheets

100

IMPLEMENTING SHADOW OBJECTS WITH RELOCATED RESOURCES TO FORM RELATIONSHIPS BETWEEN NEW AND OLD LOCATIONS

FIELD OF THE INVENTION

The present invention relates generally to the data processing field, and more particularly, relates to a method, apparatus and computer program product for implementing a shadow object with a relocated resource such as when migrating from one host to a new host, and for example, for implementing shadow objects for relocated files, folders, music files, virtual servers, virtual disks, or physical disks relocated from one rack to another.

DESCRIPTION OF THE RELATED ART

When a virtual server is migrated today, the image moves from one physical machine to another. That can have undesirable side effects in terms of the human or software entity that was managing the original virtual server.

Problems often result for current systems management tools when the workload or virtual server is migrated to a physically different location. An administrator can choose to manage a physical system and all the resources inside of it, or he can choose to manage the virtual servers regardless of where the virtual servers are located. The problem is that often there is still a strong relationship between the physical location and virtual item.

Undesirable side effects in terms of the human or software entity that was managing the original virtual server that is migrated to a physically different location, and other relocated resources include, for example, the following. An administrator may have lost sight of the virtual server since it moved to a different physical location, or other relocated resource. Management Software may have pointed to one physical location and not know where the server or other relocated resource went or even recognize that it is no longer on that one physical location. Business workloads, such as a web store-front, may no longer have access to the new location so the workload is broken. The virtual server may move security domains so that an administrator cannot follow it.

Current systems management tools allow an administrator to dynamically group things, monitor things, define tasks, and the like, all based upon the physical system or virtual system, but when these virtual servers and mobile workloads move, these tools often lose track of where they are. For example: One administrator is managing fixes, another administrator is managing virtual or mobile workloads. The fixes administrator sees the systems in Wabasha that need fixing, and is gathering the right fixes for them. However, since the workload administrator just moved a virtual server, or other relocated resource, one of the systems or other resource in the list of systems needing fixes simply disappears. There is no way to know what happened to the moved virtual server or where virtual server or mobile workload went other than asking around.

A need exists for making systems management tools "virtual aware." A need exists for a mechanism to inform an administrator and management software that a resource or virtual server has relocated or migrated to a new physical location with the capability to inform how to locate that relocated resource or new virtual server and, if needed, authorize the administrator or identify the authorized administrator of that new physical location.

SUMMARY OF THE INVENTION

A principal aspect of the present invention is to provide a method, apparatus and computer program product for implementing a shadow object with a relocated resource, such as a resource when locating from one location to a new location or migrating from one host to a new host. Other important aspects of the present invention are to provide such method, apparatus and computer program product for implementing a substantially without negative effect and that overcome many of the disadvantages of prior art arrangements.

In brief, a method, apparatus and computer program product are provided for implementing a shadow object with a relocated resource. A user selected task on a resource is identified and analyzed to determine whether the task changes a location of the resource. When determined that the task changes a location of the resource, then a shadow object is created. Destination information is captured and stored into the shadow object.

In accordance with features of the invention, a future shadow object is created on a new host to inform administrators that a virtual server is to be migrated at a scheduled time. The shadow object and future shadow object include selected information relating to a current location and selected information relating to a destination location.

In accordance with features of the invention, stored security and access controls are used to enable access to the respective shadow object and future shadow object. A relationship from the shadow to the relocated resource is added so users can see the relationship between the new and old location.

In accordance with features of the invention, the shadow object includes at least one or more selected tasks that can be preformed. For example, the selected tasks include at least one of move back, take me to the new location, delete, and log assesses to the shadow object.

In accordance with features of the invention, the shadow object is deleted, for example, after accesses to this shadow object end or when a timeout period is reached.

In accordance with features of the invention, the user can access the shadow object by selecting the shadow object in a list of virtual servers or other relocated resources.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
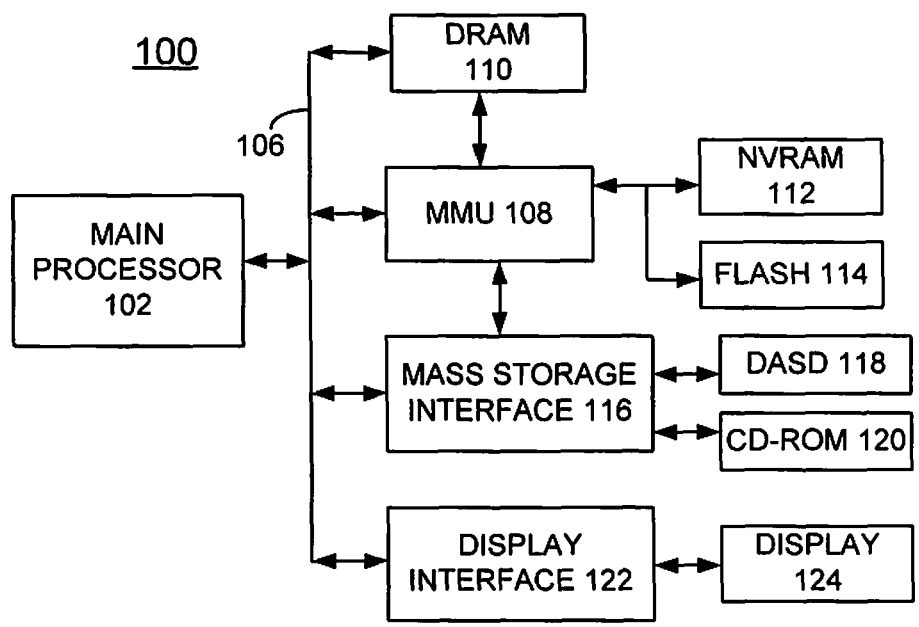
FIGS. 1A and 1B are block diagram representations illustrating an exemplary computer system and operating system for implementing methods for creating shadow objects and future shadow objects in accordance with the preferred embodiment.

In accordance with features of the preferred embodiments, a method is provided to create a shadow object representing a resource when relocating from one location to a new location, for example, the shadow object representing where a virtual server was originally located, along with a "forwarding address" for the new location of the migrated virtual server. Once the relocation or migration is complete, the shadow will remain and will serve a variety of purposes in order to make the side effects of the resource relocation or migration minimal.

The following examples illustrate when a virtual server or other relocated resource would disappear from the administrator's view and a shadow is needed: Access to virtual server (VS) or other relocated resource is based on geography, such as, east coast, and west coast. The group shows east coast and the VS or other relocated resource is moved to the west coast. Access to a virtual server or other relocated resource is based on physical host, so that the administrator is seeing a list of virtual servers or other relocated resource on a host, he clicks Migrate, and the VS or other relocated resource is migrated to a host he does not have authority to or is not currently viewing. Another administrator deleted the virtual server or other resource he is managing, but since it belonged to a static group, he gets an error and wonders where it is, for example, off-line, migrated, corrupt server, or if it was deleted. Using Hypervisor domains in Xen, hardware can be colored for specific companies uses. If a VS or other resource moves to another set of hardware, a different color, it could be removed from an administrator's view. A DVD drive was assigned to VS1 and now it is assigned to VS2. A shadow of the DVD drive would inform the first administrator where the DVD drive went. A user views several types of relationships coming from a resource in a topology. When a different administrator or an autonomic process moves a relationship, the related resource is removed. A shadow would inform the first administrator that the resource has moved without it just disappearing from view.

It should be understood that the present invention is not limited to virtual servers, but should be understood to include migration of workloads, subsystems, and the like.

In accordance with features of the preferred embodiments, the shadow provides a visual reminder that there was a virtual server here, but now it is gone. The shadow provides a new hostname/IP Address/URL/Port or other address where the new virtual server can be found. The shadow provides a security mechanism so that the shadow will give partial or complete information depending on the security access of the person asking. If user has access to original server but not the new server, for example the shadow indicates: "Server X that did such and such a job has now been migrated to new physical location yyyy and is now being administered by Admin Z." If user has access to both old and new location it will add "Server X is now called Server Y and is located at yyyy."

In accordance with features of the preferred embodiments, the shadow provides logging and notification mechanisms so that the person that migrated the server can view a list of who or what is accessing the shadow to enable updating the person and/or application. This may dictate how long the shadow is available, for example, as long as access is being requested to the shadow object, it should remain there. The shadow logs when it is accessed and will notify the administrator. The shadow provides relationship views to show where there are mismatches between the relationships from the old location to the new location. If there are any differences, the shadow advantageously is used to access those older relationships so that a business workload still runs. This is very important because if I migrate a data server to another physical location, and a web site that accessed the data can no longer reach the new location, the web site is down. However, with this shadow of the preferred embodiments, the shadow can be accessed for a period of time while the administrator fixes the problem. The shadow provides temporary piping to the new location so applications that require access to the work being done on the virtual server can still get their work done.

In accordance with features of the preferred embodiments, when a migrate is scheduled, a "future shadow" is created on the new host to inform administrators that a virtual server is to be migrated at a scheduled time. Since the tool knows a migrate has been scheduled, a future shadow is created and stored on the new host so that an administrator managing the new host knows what is coming and can prepare for it.

Figure 1B:
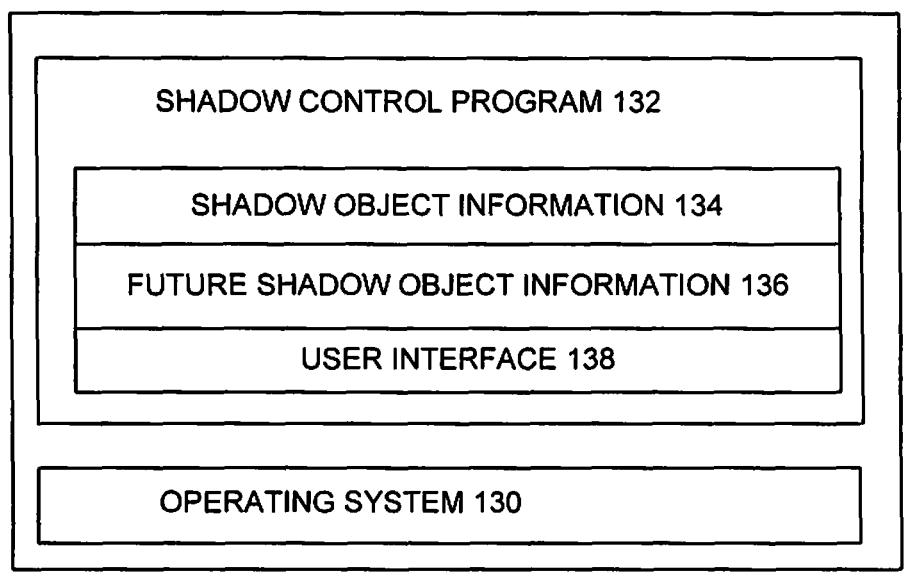

Having reference now to the drawings, in FIGS. 1A and 1B, there is shown an exemplary server or computer system generally designated by the reference character 100 for implementing methods for implementing both shadow objects and future shadow objects in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 130, a shadow control program 132 of the preferred embodiment, shadow object information 134 and future shadow object information 136 of the preferred embodimen, and a user interface 138. Shadow object information 134 and future shadow object information 136 are identified and stored in accordance with methods for implementing shadow objects in accordance with the preferred embodiment. Shadow object information 134 and future shadow object information 136 can be programmatically accessed, for example, through a command line or an application program interface (API) or visually via the user interface 138.

The shadow object information 134 and future shadow object information 136 can be implemented in a variety of ways. A respective object of the same type as the new virtual server can represent both the shadow object information 134 and future shadow object information 136. Alternatively the shadow object information 134 and future shadow object information 136 could become a new object type. A property of the new type indicates that this is a shadow of a moved Virtual Server or other relocated resource and is presented visually in a unique way. Both the shadow object information 134 and future shadow object information 136 contain pertinent information that describes the relationship between the shadow and the real virtual server or other relocated resource. Both the shadow object information 134 and future shadow object information 136 also optionally contain a set of relationships showing the state of the environment before the migration or resource relocation occurred and another set of relationships showing the state after the migration.

Various commercially available computers can be used for computer system 100, for example, an IBM personal computer or an IBM server computer, such as an IBM System p™ server computer. CPU 102 is suitably programmed by the dynamic task access control program 132 to execute the flow-charts of FIG. 2 and FIG. 3 to implement methods for implementing shadow objects and future shadow objects in accordance with the preferred embodiment.

Figure 2:
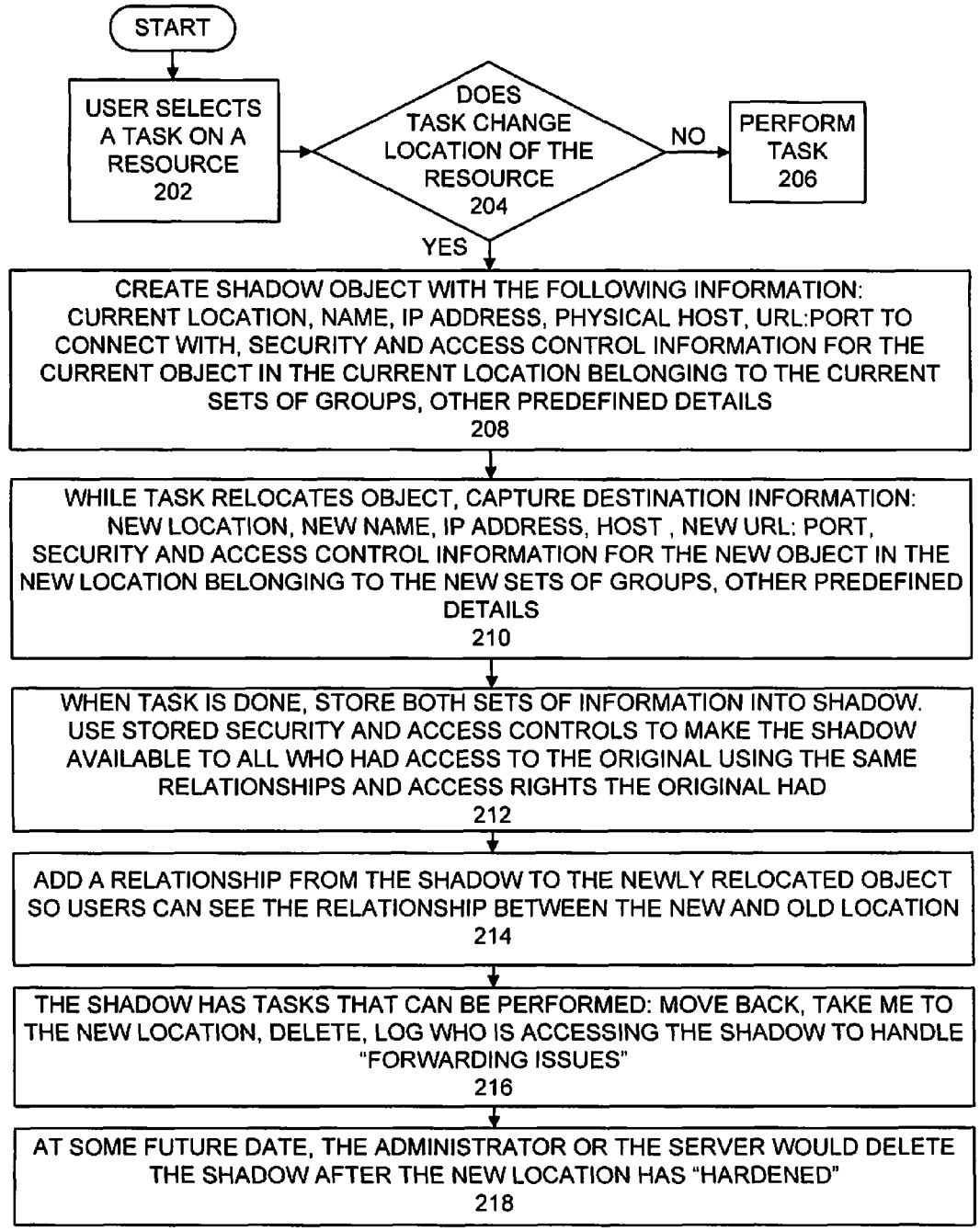
FIG. 2 is a flow chart illustrating exemplary steps for implementing a shadow object in accordance with the preferred embodiment.

Referring to FIG. 2, there are shown exemplary steps for implementing a shadow object in accordance with the preferred embodiment. As indicated in a block 202, a user selects a task on a resource. The task selected at block 202 could be any task that changes where the resource is located, any resource. As indicated in a block 204, the computer-implemented method analyzes the task the user selects. Checking whether the task changes the location of the resource is performed as indicated in a decision block 204. If the task does not change the location of the resource, then the task is performed as indicated in a block 206.

When the task changes the location of the resource, then a shadow object is created as indicated in a block 208. As indicated at block 208, the shadow object advantageously includes the following information: current location, name, Internet protocol (IP) address, physical address, URL:port to connect with, Security and access control information for the current object in the current location belonging to the current sets of group; and other predefined details. Next while the task relocates the object, destination information is captured as indicated in a block 210. The destination information advantageously includes the following information: new location, new name, IP address, host, new URL:port, Security and access control information for the new object in the new location belonging to the new sets of group; and other predefined details. When the task is done, both sets of information are stored into the shadow object as indicated in a block 212. As indicated at block 212, stored security and access controls are used to make the shadow object available to all who had access to the original using the same relationships and assess rights to the original resource.

A relationship is added from the shadow object to the newly relocated object so users can see the relationship between the new and old location as indicated in a block 214. Relationship views at block 214 are used to show where there are mismatches between the relationships from the old location to the new location. If there are any differences, the shadow can be used to access those older relationships so that a businesses workload still runs. This is very important because if a data server is migrated to another physical location, and a web site that accessed the data can no longer reach the new location, the web site is down. However, with the shadow, the web site can access the shadow for a period of time while the administrator fixes the problem.

As indicated in a block 216, the shadow or shadow object has task that can be performed, such as, Move back, Take me to the new location, Delete, and Log who is accessing the shadow to handle "forwarding" issues. Logging and notification mechanisms are provided so that the person that migrated the server can view a list of who or what is accessing the shadow so that the person/application can be updated. This may dictate how long the shadow is available, as long as access is being requested to the shadow, the shadow object is maintained and logs when it is accessed and notifies the administrator. Finally, the shadow is deleted at some future date by the administrator or server software after the new location has "hardened" as indicated in a block 218.

In accordance with features of the preferred embodiments, at block 216 the user can access this shadow by just selecting an object, for example, in a list of virtual servers. If I have authority to manage the new virtual server I will get redirected to the new virtual server or other relocated resource. The shadow will only remain for a short period of time until such a time when the shadow is no longer accessed or when a timeout period is reached, and then deleted at block 218. All of these capabilities can be governed by a Policy setting or general preferences so that the IT shops security, access control, and policies are honored.

Figure 3:
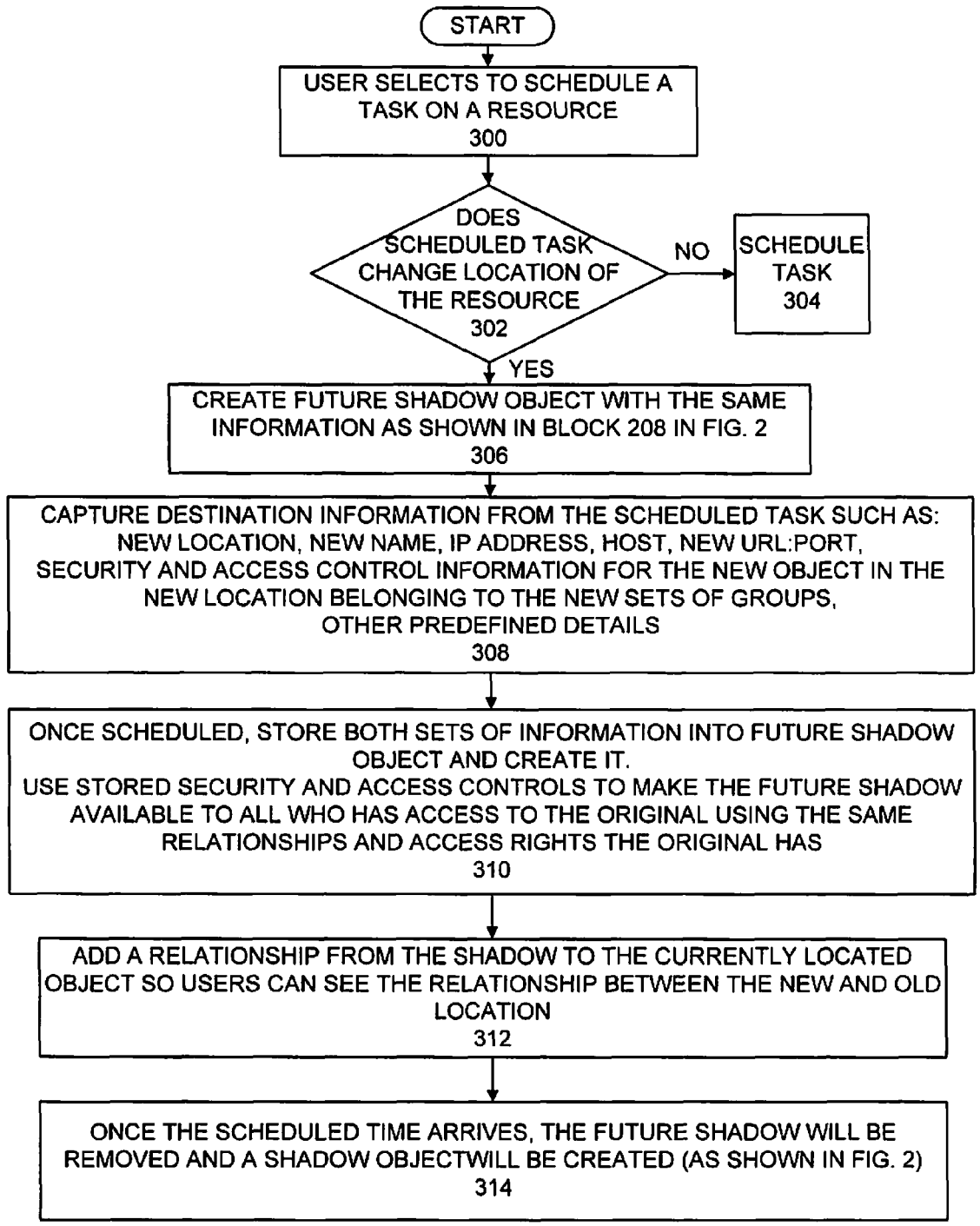
FIG. 3 is a flow chart illustrating exemplary steps for implementing a future shadow object in accordance with the preferred embodiment.

Referring to FIG. 3, there are shown exemplary steps for implementing a future shadow object in accordance with the preferred embodiment. As indicated in a block 300, a user selects to schedule a task on a resource. The task selected at block 300 could be any task that changes where the resource is located, any resource. As indicated in a block 302, the computer-implemented method analyzes the scheduled task the user selects. Checking whether the scheduled task changes the location of the resource is performed as indicated in a decision block 302. If the scheduled task does not change the location of the resource, then the task is scheduled as indicated in a block 304.

Otherwise when the scheduled task changes the location of the resource, a future shadow object is created as indicated in a block 306. The future shadow object advantageously includes the same information as shown in block 208 in FIG. 2 as follows: current location, name, Internet protocol (IP) address, physical address, URL:port to connect with, Security and access control information for the current object in the current location belonging to the current sets of group; and other predefined details. Next destination information is captured from the scheduled task as indicated in a block 208. The destination information advantageously includes the following information: new location, new name, IP address, host, new URL:port, Security and access control information for the new object in the new location belonging to the new sets of group; and other predefined details. Once scheduled, both sets of information are stored and the shadow object is created as indicated in a block 310. As indicated at block 310, stored security and access controls are used to make the future shadow object available to all who had access to the original using the same relationships and assess rights to the original resource.

A relationship is added from the future shadow object to the currently located object so users can see the relationship between the new and old location as indicated in a block 312. As indicated in a block 314 Once the scheduled time arrives, the future shadow object is removed and a shadow object is created, as illustrated in the flowchart of FIG. 2.

Figure 4:
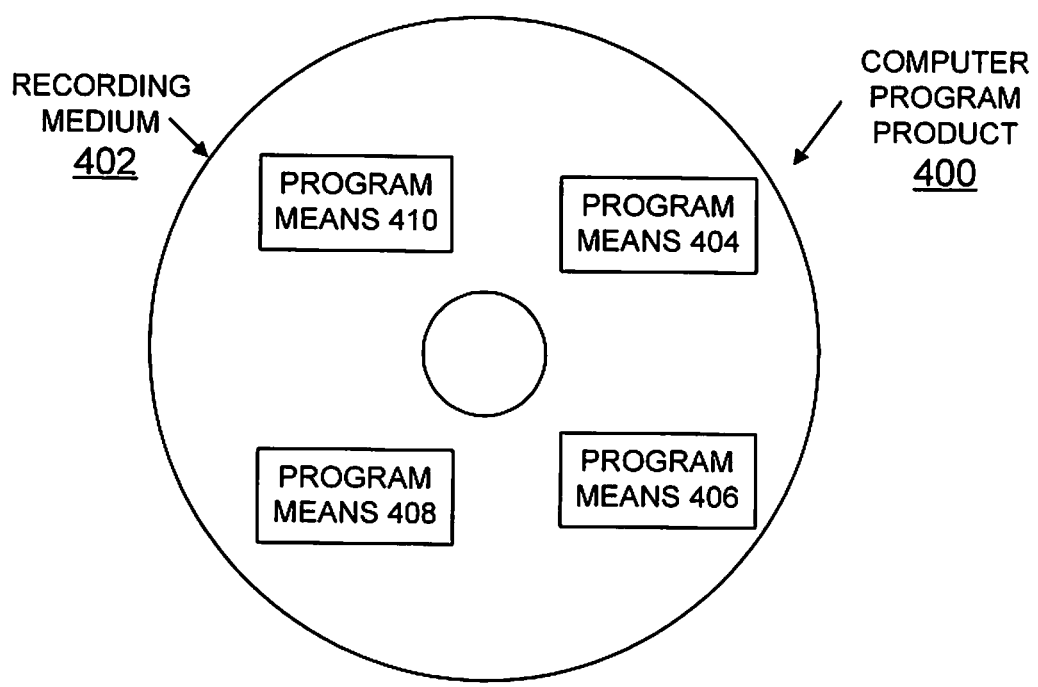
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing methods for creating shadow objects and future shadow objects of the preferred embodiment in the system 100 of FIGS. 1A and 1B.

A sequence of program instructions or a logical assembly of one or more interrelated modules defined by the recorded program means 404, 406, 408, 410, direct the computer system 100 for implementing methods for creating shadow objects and future shadow objects of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing a shadow object with a relocated resource comprising:
    identifying and analyzing a user selected task on a resource to determine whether the task changes a current location of the resource;
    responsive to determining the task changes a location of the resource, creating a shadow object; said shadow object including predefined information of the current location, name, Internet protocol (IP) address, host physical memory address, URL:port, and security and access control information; and said shadow object being programmatically accessed;
    capturing and storing destination information into the shadow object, when the task relocates the resource; said shadow object including destination information of the new location, new name, IP address, host physical memory address, new URL:port, and security and access control information;
    deleting the shadow object responsive to a predefined event; and
    adding a relationship from the shadow object to a relocated resource to show a relationship between a new and old location.

2. A computer-implemented method for implementing a shadow object as recited in claim 1 further includes creating a future shadow object when the user selects to schedule a task on the resource and said scheduled task changes the current location of the resource at a scheduled time.

3. A computer-implemented method for implementing a shadow object as recited in claim 2 further includes using stored security and access controls to enable access to a respective shadow object and future shadow object.

4. A computer-implemented method for implementing a shadow object as recited in claim 1 further includes storing selected information relating to a current location and storing selected information relating to a destination location in the shadow object including storing current information including the security and access control information for a current object in the current location belonging to current sets of groups and storing destination information including the security and access control information for the new object in the new location belonging to new sets of groups.

5. A computer-implemented method for implementing a shadow object as recited in claim 2 further includes storing selected information relating to a current location and storing selected information relating to a destination location in the future shadow object.

6. A computer-implemented method for implementing a shadow object as recited in claim 1 further includes providing the shadow object with at least one selected task that can be performed by the shadow object.

7. A computer-implemented method for implementing a shadow object as recited in claim 6 wherein said at least one selected task that can be performed by the shadow object includes at least one of move back, take me to the new location, delete, and log assesses to the shadow object.

8. A computer-implemented method for implementing a shadow object as recited in claim 1 further includes a user accessing the shadow object by selecting the shadow object in a list of relocated resources.

9. A computer-implemented method for implementing a shadow object as recited in claim 1 wherein deleting the shadow object is performed after identifying an end of accesses to the shadow object.

10. A computer-implemented method for implementing a shadow object as recited in claim 1 wherein deleting the shadow object is performed after a timeout period is reached.

11. A computer-implemented method for implementing a shadow object as recited in claim 1 further includes identifying a user selected access to the shadow object.

12. A computer-implemented method for implementing a shadow object as recited in claim 11 includes the user selecting the shadow object in a list of virtual servers.

13. A computer program product for implementing a shadow object with a relocated resource, said computer program product including instructions stored on a non-transitory computer readable storage medium, said instructions when executed by a computer system to cause the computer system to perform the steps of:
    identifying and analyzing a user selected task on a resource to determine whether the task changes a location of the resource;
    responsive to determining the task changes a location of the resource, creating a shadow object; said shadow object including predefined information of the current location, name, Internet protocol (IP)address, host physical memory address, URL:port, and security and access control information; and said shadow object being programmatically accessed;
    capturing and storing destination information into the shadow object; said shadow object including destination information of the new location, new name, IP address, host physical memory address, new URL:port, and security and access control information;
    deleting the shadow object responsive to a predefined timeout event; and
    adding a relationship from the shadow object to a relocated resource to show a relationship between a new and old location.

14. A computer program product for implementing a shadow object as recited in claim 13 further includes creating a future shadow object when user selects to schedule a task on the resource, and said scheduled task changes the location of the resource at a scheduled time.

15. A computer program product for implementing a shadow object as recited in claim 13 further includes providing the shadow object with at least one selected task that can be performed by the shadow object, said at least one selected task including at least one of move back, take me to the new location, delete, and log assesses to the shadow object.

16. Apparatus for implementing a shadow object with a relocated resource comprising:
    a processor, a shadow control program tangibly embodied in a non-transitory machine readable medium, said shadow control program including instructions stored on non-transitory machine readable medium executed by said processor;

said processor using said shadow control program, identifying and analyzing a user selected task on a resource to determine whether the task changes a location of the resource;

said processor using said shadow control program responsive to determining the task changes a location of the resource, creating a shadow object; said shadow object including predefined information of the current location, name, Internet protocol (IP) address, host physical memory address, URL:port, and security and access control information; and said shadow object being programmatically accessed;

said processor using said shadow control program, capturing and storing destination information into the shadow object; said shadow object including destination information of the new location, new name, IP address, host physical memory address, new URL:port, and security and access control information;

said processor using said shadow control program, deleting the shadow object responsive to a predefined timeout event; and said processor using said shadow control program adds a relationship from the shadow object to a relocated resource to show a relationship between a new and old location.

17. Apparatus for implementing a shadow object as recited in claim 16 wherein said processor using said shadow control program uses stored security and access controls to enable access to the shadow object.

* * * * *